Patented June 19, 1945

2,378,674

UNITED STATES PATENT OFFICE 2,378,674

BOX TOE MATERIALS AND METHOD OF MAKING THE SAME

John W. Wiley, Lancaster Township, Lancaster County, Pa., assignor to Armstrong Cork Company, Lancaster, Pa., a corporation of Pennsylvania No Drawing. Application January 24, 1942, Serial No. 428,119

1 Claim. (Cl. 260—4)

This invention relates to box toe materials and a method of making the same and, more particularly, to the preparation of a thermoplastic composition adapted for use in the manufacture of stock from which are made box toe blanks for shoes.

A number of methods have been proposed to prepare thermoplastic compositions suitable for such use. For example, crude rubber has been milled with a hydrophilic colloid, such as a casein paste, and the casein-protected rubber particles have been added to a melted mass of rosin. A second method includes the steps of dissolving rubber in a volatile solvent, or using a vulcanized latex, and adding these to a rosin or rosin and asphalt mixture. Still another method proposed includes the steps of mixing unvulcanized rubber and copal together, and adding the mixture to a mass of rosin and wax.

The proposed methods possess various disadvantages which seriously interfere with the use of thermoplastic compositions so prepared and in fact render the compositions unsatisfactory for their intended uses. Frequently, their preparation is so expensive as to seriously interfere with their use since box toe blanks need be quite inexpensive. In many cases, depolymerization of the rubber occurs during preparation which renders the composition unsatisfactory; in other cases, the rubber is not vulcanized so that the saturant is highly viscous. If the saturant be highly viscous, depolymerization of the rubber frequently occurs since the temperature of the impregnating operation necessarily need be maintained very high (above the temperature at which substantial depolymerization occurs) to render the composition thin enough to permit impregnation. When the saturant is highly viscous, tremendous dilution by solvents may be required for impregnation so that insufficient stiffening material is present in the final box toe blank. These processes, generally speaking, are undesirable, inefficient and unsatisfactory but were commonly used in the industry since no better or more efficient method was known.

I have found that it is essential that the rubber in thermoplastic compositions of this general type be vulcanized. Unfortunately, if rubber vulcanized to any substantial extent be added to the fused thermoplastic materials it is extremely difficult to disperse the rubber satisfactorily; even when dispersed, the rubber retains its separate identity and is present throughout the composition in the form of small particles or lumps. Even though the rubber be vulcanized, extreme care need be taken to prevent depolymerization of the rubber. If unvulcanized rubber be used, excessive depolymerization of the rubber occurs or the resulting composition is so viscous as to prevent satisfactory impregnation in the manufacture of box toe blanks.

The chief object of my invention is to improve the preparation of thermoplastic compositions for use in the manufacture of box toe blanks. An object of my invention is to provide a method of making thermoplastic compositions of the type described above in which the stiffening compound is a solution. A further object of my invention is to provide an economical, efficient and improved method of making thermoplastic compositions. A still further object is to provide an improved thermoplastic composition for use in the manufacture of box toe blanks. A still further object is to provide an improved method of adding rubber to a thermoplastic material to increase its strength and toughness without substantial change in its thermoplasticity and viscosity.

In the present invention, the thermoplastic composition is prepared by grinding together in a rubber mill a mixture of unvulcanized rubber, sulfur, and cumar (coumarone-indene resin) until a homogeneous mass is formed in which the rubber is in unvulcanized condition. This homogeneous mass is then added to and dissolved in a preponderant amount of fused or melted rosin and candelilla wax to form a solution. It is essential in my invention that the temperature of the rosin-wax and the period of dissolution be so coordinated as to prevent substantial vulcanization or depolymerization of the rubber. After complete dissolution, the temperature of the solution is then increased to effect vulcanization of the rubber without substantial depolymerization. The solution may then be cooled to solidify the same and stored for use or the temperature of the solution may be increased slightly to permit its immediate use in the impregnation of a permeable fibrous base such as felt, paper, cotton flannel, canvas duck or the like.

In order that my invention may be readily understood, I will describe a preferred embodiment thereof. A satisfactory stiffening compound may be formed by following the procedure outlined below:

A rubber-resin master batch is first prepared and may comprise the following ingredients in substantially the proportions given by weight:

| | Parts |
|---|---|
| Reclaim rubber | 47.4 |
| Cumar | 38.0 |
| Rosin | 9.4 |
| Sulfur | 4.7 |
| Anti-oxidant | 0.5 |

The reclaim rubber is placed in a rubber mill heated to approximately 250° F. The cumar and rosin, preferably, in the form of broken lumps or small pieces, are then added to the rubber and milled therewith until a homogeneous mass is formed which generally requires about fifteen minutes. The sulfur and anti-oxidant are then dispersed in the rubber-resin mass, which requires about two to three minutes, and the mass is immediately removed from the mill to prevent vulcanization of the rubber. A homogeneous mass is thus formed with little or no vulcanization of the rubber. The mass may be cooled and stored for use for several months without vulcanization occurring or, if desired, it may be used immediately.

If desired, crude rubber or so-called guayule rubber may be used in place of reclaim rubber; generally speaking, the use of artificial rubbers of the polymerized chloroprene or polymerized butadiene types is undesirable since they do not appear to form a satisfactory solution with rosin, for example. I may use any of the various grades of rosin or I may substitute therefor any of the usual thermoplastic materials commonly used in the industry. If desired, the cumar may be omitted and rosin or montan wax used in its place or montan wax may be used in place of rosin and/or cumar. As an anti-oxidant I prefer to use "Age-Rite" but any of the usual commercial anti-oxidants may be used with satisfactory results.

A satisfactory thermoplastic stiffening compound may be made by the following formula:

| | Parts by weight |
|---|---|
| Rubber-resin master batch | 22.4 |
| Candelilla wax | 2.0 |
| Rosin | 75.6 |

If desired, montan wax may be used in place of candelilla wax. Any of the thermoplastic materials common in the industry may be used in place of rosin.

The rosin and candelilla wax are placed in a suitable mixer and heated to approximately 150–160° F. for about one hour to melt or fuse the rosin and the wax. Preferably, the mixer is heated before the rosin and wax are placed therein to decrease the time of fusion. The master batch is then added slowly while the mixer is agitating the melted mass and is dissolved in the mass to form a solution. At a temperature of 150–160° F. it requires roughly six hours to obtain complete dissolution and at this time the viscosity of the mass is increased appreciably.

After complete dissolution of the master batch in the fused thermoplastic mass to form a solution, the temperature of the mass is raised to 220° F. to vulcanize the rubber. The solution becomes thinner and less viscous as vulcanization of the rubber proceeds since the rubber loses its thermoplasticity and gummy characteristics which tend to increase the viscosity of the solution until approximately the original viscosity of the thermoplastic material is reached. It requires about sixteen hours for satisfactory vulcanization at the temperature disclosed above and in all cases the vulcanizing temperature need be sufficiently low as not to effect substantially depolymerization of the rubber. The time required to form a satisfactory stiffening compound is from eight to forty-eight hours varying, of course, with the temperatures at which the operation is conducted.

If desired, the temperature of dissolution of the master batch in the rosin-wax mass may vary from 150° F. to perhaps 350° F.; the length of the period of dissolution, of course, varies inversely as the temperature. That is, higher temperatures require a shorter period of time to obtain complete dissolution; for example, at 350° F. the master batch dissolves satisfactorily to form a solution within a few minutes and the rubber may then be vulcanized. In all cases, it is essential that the temperature of the mass and length of dissolution time be coordinated so as not to effect substantially depolymerization or vulcanization of the rubber.

After the compound is formed, it may be cooled and stored for use without precipitating the rubber or effecting its solution characteristics. If desired, the compound may be used immediately in the impregnation or saturation of a suitable fibrous foundation or base.

The stiffening compound so prepared appears under microscopic examination at 1000 magnifications to possess the characteristics of a solution, that is, each of the individual ingredients composing the compound appears to have lost its individual identity whether the compound is in its liquid or solid phase. At least the rubber particles are not present with their initial identity in the stiffening compound so prepared under microscopic examination at the magnification above mentioned so that I believe the compound to be either a colloidal or a true solution. An additional fact which appears to confirm my belief that the compound is a solution is the change in viscosity of the thermoplastic material after the rubber-resin master batch is incorporated therein. As is well-known, small amounts of rubber in solution increase the viscosity of the solution while if the rubber be in dispersed or suspended form, the viscosity is not appreciably effected. As pointed out above, the viscosity of the rosin-wax solution is appreciably increased by the dissolution of the rubber-resin master batch therein and such increase in viscosity is apparent until the rubber becomes vulcanized and loses its thermoplastic and gummy characteristics.

In the manufacture of stock for severance into box toe blanks the thermoplastic composition described above may be heated to 320–350° F. to render it liquid. A web of felt, paper, cotton flannel or canvas duck is saturated or impregnated with the liquid solution by passing it through a saturating tank, the excess saturant being removed by drawing the web through squeeze rods or pressure rolls. The saturated web may be cooled at atmospheric temperature or may be passed through a refrigerated room, if desired, to expedite cooling. When the web is cooled, it appears that the liquid solution has changed to its solid phase without affecting or disturbing the solution. Blanks may then be die-cut from the web and may be skived if desired to form thin or tapered edges. The blanks are resilient, tough, and flexible and can be rendered easily moldable by the application of moderate heat.

I have found that rubber latex may be used in place of reclaim rubber in the preparation of a satisfactory thermoplastic composition but its use involves various changes in the process described above. I will now describe a suitable process in which latex may be used in the formation of a suitable thermoplastic composition. I first prepare what I term a "vulcanizing dispersion." Such dispersion may be formulated as follows:

| | Parts by weight |
|---|---|
| Powdered sulfur | 100 |
| Anti-oxidant ("Age-Rite") | 20 |
| Linseed acids | 5 |
| Ammonium hydroxide (28%) | 2 |
| Water | 107 |

The powdered ingredients are placed in a ball mill with one-half of the amount of water stated above. The mill may be operated for several hours until all of the powdered ingredients are thoroughly wetted. The remainder of the water is then added and the mill operated until satisfactory dispersion is obtained. The linseed acids and ammonium hydroxide react to form a dispersing agent which assists in holding the powdered ingredients in suspension.

The stiffening compound may comprise the following:

| | Wet | Dry |
|---|---|---|
| | Per cent by weight | Per cent by weight |
| Rosin | 66.3 | 77.8 |
| Cumar | 7.5 | 8.8 |
| Candelilla wax | 1.7 | 2.1 |
| Rubber latex (38%) | 22.3 | 10.0 |
| Vulcanizing dispersion | 2.2 | 1.3 |

The rosin, cumar, and wax are placed in a mixer and heated within the range of 150°–200° F. and preferably to approximately 180° F. The latex and vulcanizing dispersion are mixed together and added slowly to the fused mass while it is maintained at the above temperature. The temperature of the mass is then raised to evaporate the water from the fused mass but should not be increased to a point where vulcanization or depolymerization of the rubber might occur. After all the water is removed, the temperature may be maintained within the range of 220°–350° F. to vulcanize the rubber without substantial depolymerization. The thermoplastic composition may then be used as described above.

My invention improves considerably the preparation of thermoplastic compositions used in the manufacture of box toe blanks. The process is economical and efficient and the composition produced is highly satisfactory in use. The provision of such composition permits the manufacture of a shoe stiffener blank which is hard, resilient and flexible so that it may impart to the shoe a maximum degree of firmness and yet not be brittle, so that when subjected to deforming pressure it will resume its original shape upon removal of the pressure. A blank containing such composition may be tempered quickly and lasted with little effort.

While I have disclosed a preferred embodiment of my invention, it will be understood my invention is not so limited but may be otherwise embodied within the scope of the following claim.

I claim:

A thermoplastic composition adapted for use as a saturant for fibrous material which comprises a solution composed of the following ingredients in approximately the proportions stated by weight:

| | Parts |
|---|---|
| Rosin | 78.0 |
| Candelilla wax | 2.0 |
| Cumar | 8.2 |
| Reclaim rubber | 10.7 |
| Sulfur | 1.0 |
| Anti-oxidant | 0.1 |

JOHN W. WILEY.